UNITED STATES PATENT OFFICE.

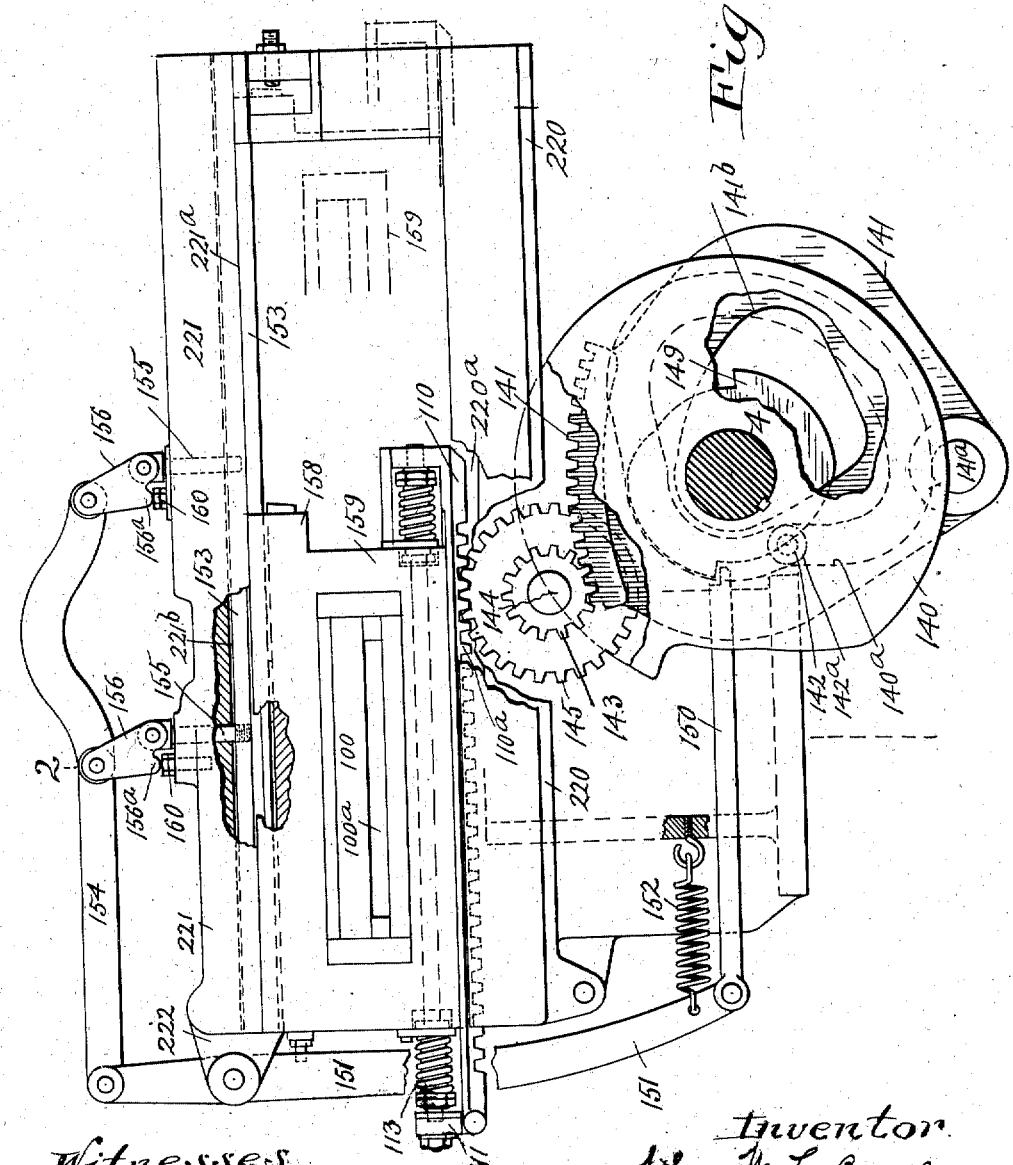

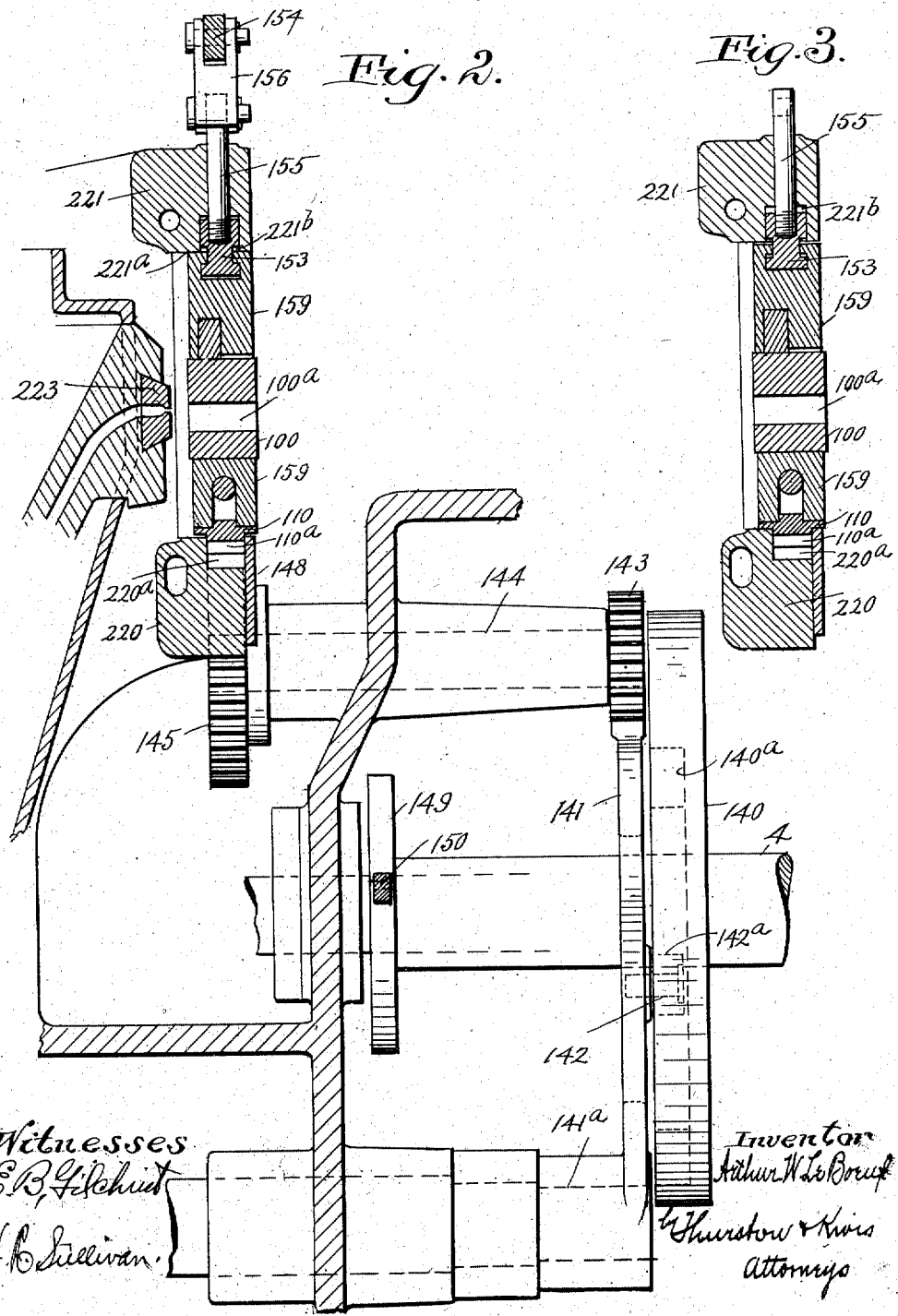

ARTHUR W. LE BOEUF, OF WOONSOCKET, RHODE ISLAND, ASSIGNOR TO ELECTRIC COMPOSITOR COMPANY, OF NEW YORK, N. Y., A CORPORATION OF NEW JERSEY.

MOLD-LOCK FOR LINOTYPE-MACHINES.

982,834.      Specification of Letters Patent.      Patented Jan. 31, 1911.

Application filed May 23, 1910. Serial No. 562,809.

*To all whom it may concern:*

Be it known that I, ARTHUR W. LE BOEUF, a citizen of the United States, residing at Woonsocket, in the county of Providence and State of Rhode Island, have invented a certain new and useful Improvement in Mold-Locks for Linotype-Machines, of which the following is a full, clear, and exact description.

This invention pertains to the kind of linotype machines in which the mold slides back and forth in suitable guideways between two terminal positions, viz., one in which the linotype is cast in the mold, and one in which the linotype is ejected from the mold. In such machines, the frequent reciprocation of the mold, back and forth between these positions, wears the engaging surfaces of the mold and the guideways on which it is supported as it slides to such an extent that, before long, the vertical alinement of the mold relative to the matrix line (and nozzle) at one terminal position and to the ejector at the other becomes so inaccurate that the worn parts have to be replaced.

The object of this invention is to provide a practical construction in which the vertical alinement of the mold at both ends of its path is effected by bringing into engagement surfaces that are not subject to wear during back and forth movement of the mold.

The invention consists, generally speaking, in providing the mold with a surface which is parallel with that on which it is supported while sliding, and in providing a fixed surface which is parallel with the guideways on which the mold slides, together with means whereby when the mold reaches either terminal position these two surfaces are brought into engagement, thereby accurately positioning the mold.

The drawing shows the invention embodied in practical form.

The specific embodiment of the invention is described in the following specification, and the parts and combinations of parts thereof which constitute the invention are accurately defined in the appended claims.

In the drawing, Figure 1 is a front elevation of the mechanism in which the present invention is embodied. Fig. 2 is a vertical sectional view in the plane indicated by line 2—2 on Fig. 1, and it shows the position of the mold relative to the other parts when said mold has been alined and clamped in the casting position. Fig. 3 is a sectional view of the mold and the means for supporting and vertically alining the same, said parts being shown in the positions they occupy when the mold slides on the guideways between the two terminal positions.

The movable mold member is made up of a plurality of pieces, although that is a characteristic which is of no consequence whatever to the present invention. So far as relates to the means for supporting and alining the mold, this mold member might be of a single piece. As shown, the mold member consists of a mold carrier 159, which is a built up rectangular frame; the mold block 100 (having the linotype slot 100$^a$) which is rigidly fixed in a suitable recess in the mold carrier; and the driving rack bar 110 on which the mold carrier is secured; said rack bar having on its lower face a centrally placed depending rack 110$^a$. This rack bar rests and slides upon a fixed horizontal frame member 220, which has in its top surface a groove 220$^a$ into which the depending rack is fitted. This grooved frame member is the principal guide member for the mold, and supports it as the mold slides back and forth. A fixed frame member 221 lies above the mold and its lower carefully finished surface 221$^a$,—(parallel with the top surface of the member 220) serves as the alining surface which, by engaging with the carefully finished top surface of the mold carrier, effects the vertical alinement of the mold.

In the lower face of the member 221 is a groove 221$^b$ for the reception of the upper end of the mold carrier locking bar 153. The lower part of this lock bar—that is to say, the part which projects downward below the member 221 has a T-shaped or dove tail formation which fits in a correspondingly shaped groove in the top surface of the mold carrier 159,—which groove extends from one end to the other of said mold carrier. This locking bar serves as the upper guide for the mold. Two locking rods 155 pass down through guide holes in the member 221 and are screwed into or otherwise fastened to the locking bar 153. Pivoted to each of the locking rods is a locking lever 156,—each of which levers has a toe 156$^a$ overhanging and engaging a fixed horizontal surface which, in the construction shown, is the upper end of the head of a cap screw which screws into the frame member 220,—the screw construction permitting a very nice adjustment of the vertical height of this surface upon which the toe 156ª rests. A locking link 154 is pivotally connected with both of the bolt locking levers 156.

A locking lever 151 is pivoted to a fixed bracket 222. The lower end of this lever has a pivotal connection with a guided plunger 150, the end of which engages with the face of a cam 149 fixed to the cam shaft 4; and a spring 152 acting upon the lever 151 supplies thereto a force which will move said lever and the parts with which it is connected as far as such movement is permitted by the engagement of said plunger with the face of said cam. When the cam permits it, therefore, the described parts associated with the lever 151 are moved by this spring with the result of swinging levers 156 so that, as their toes 156ª bear upon the surfaces 160, the bolts 155 will be drawn up; and they will draw up the locking bar 153, and it will draw the mold structure up until the top surface of the mold carrier 159 and the bottom surface 221 of the frame member 221 will be in engagement. When these surfaces do engage, as stated, the vertical alinement of the mold has been effected. It is to be noted that these surfaces are not in contact when the mold is sliding backward and forward between its two terminal positions, and therefore are not worn by said sliding movement; and it should be understood and will be made clear by what follows, that it is when the mold is at its two terminal positions that the mold is drawn up to cause the engagement of the alining surfaces.

Fixed to a shaft 144 are the gear 145 which engages with the rack 110, and the pinion 143, which engages with the gear segment 141 which is hung on the pivot 141ª. This gear segment has a hole in it, which hole is indicated by the dotted line 141ᵇ; and the cam shaft 4 passes through this hole. Fixed to this cam shaft is a disk 140 having a cam groove 140ª in its inner face. A stud 142 carrying a friction roller 142ª is fixed to and projects from the gear segment 141 into this cam groove. This cam groove is so shaped that during each revolution of the cam shaft 4 the segment will be rocked to the left from the position shown in Fig. 1 so as to move the mold through the described mechanism, to one terminal position and hold it there for a long enough period; and then back again to its other terminal position. The cam 149 which, as stated, is fixed to shaft 4, is so shaped that twice during each revolution of the cam shaft 4, the plunger 150 will be permitted to move quickly (under the influence of spring 152) in the mold locking direction.

While it is no part of the present invention, it may aid to an understanding of the operation and value of the described invention, if it be explained that in a complete linotype machine in which this invention is employed the shaft 4 makes one complete revolution whenever a matrix line has been assembled and the line key is depressed. During that one revolution mechanism which is for most part controlled and operated by said shaft will operate in properly timed sequence all of the parts which cause the casting and ejecting of a linotype.

Having described my invention, I claim:

1. In a linotype machine, the combination of a reciprocating mold structure, a guideway on which it may slide back and forth,—said mold structure being provided with an upper alining surface, a frame member having a coöperating alining surface above the alining surface on the mold structure, and means for drawing the mold upward to bring said alining surfaces into engagement.

2. In a linotype machine, the combination of a mold structure, a guide frame member upon which the mold structure rests while it slides backward and forward, means for moving said mold structure backward and forward, the upper member of the mold structure having a dove tail groove extending from end to end and having a finished top alining surface, a frame member over the mold structure having a corresponding lower alining surface, a locking bar vertically movable in said frame member and having a dove tailed lower edge which fits into the dove tail groove in the mold structure, and means for drawing said locking bar upward.

3. In a linotype machine, the combination of a mold structure, a guide frame member upon which the mold structure rests while it slides backward and forward, means for moving said mold structure backward and forward, the upper member of the mold structure having a dove tail groove extending from end to end and having a finished top alining surface, a frame member over the mold structure having a corresponding lower alining surface, a locking bar vertically movable in said frame member and having a dove tail lower edge which fits into the dove tail groove in the mold structure, two vertical rods fixed to the locking bar and extending outward through the guide holes in the frame member, levers pivoted to the upper end of said rods, each having a toe which engages with a fixed surface, a link connecting said levers, spring actuated means for moving said link endwise, a cam, and intermediate mechanism for moving the link in the opposite direction.

4. In a linotype machine, the combination of a mold structure, a guide frame member upon which the mold structure rests while it slides backward and forward, means for moving said mold structure backward and forward, the upper member of the mold structure having a dove tail groove extending from end to end and having a finished top alining surface, a frame member over the mold having a corresponding lower alining surface, a locking bar vertically movable in said frame member and having a dove tail lower edge which fits into the dove tail groove in the mold structure, levers pivoted to the upper end of said rods, each having a toe which engages with a fixed surface, a link connecting said levers, a lever pivoted to said link, a guided plunger connected to the lower end of the lever, a rotatable cam with which the end of said plunger may engage, a spring acting to move the plunger toward said cam, a cam shaft to which said cam is fixed, a rack fixed to the mold structure, a rocking gear segment, gearing intermediate of the same and said rack, and a cam fixed to the same cam shaft for rocking said gear segment.

5. In a linotype machine, the combination of a reciprocating mold structure, a guideway on which it may slide back and forth, said mold structure being provided with an upper alining surface, a frame member having a coöperative alining surface above the alining surface on the mold structure, means for moving said mold backward and forward, and means for drawing the mold upward to bring said alining surfaces into engagement when the mold structure is at both ends of its path.

In testimony whereof, I hereunto affix my signature in the presence of two witnesses.

ARTHUR W. LE BOEUF.

Witnesses:
EDWARD F. GODDARD,
ROY J. SOULER.